Feb. 16, 1943.  T. V. OSBORNE  2,311,123
TOY TRAILER TRUCK
Filed March 21, 1942  2 Sheets-Sheet 2

Inventor
Thomas Vivian Osborne

By Clarence A. O'Brien
and Harvey B. Jackson
Attorneys

Patented Feb. 16, 1943

2,311,123

UNITED STATES PATENT OFFICE 2,311,123

TOY TRAILER TRUCK

Thomas Vivian Osborne, Greensboro, N. C.

Application March 21, 1942, Serial No. 435,609

3 Claims. (Cl. 46—201)

The present invention relates to new and useful improvements in toys and more particularly to toy trucks and trailer trucks constructed of demountable units of a type adapted to be packed and sold with suitable instructions to educate and amuse children in the construction and assembly of the toy.

An important object of the present invention is to provide a toy trailer truck of this character, preferably constructed of detachable wooden units and embodying a tractor including an integrally formed chassis, running board, fender and engine portion, together with a detachable cab unit adapted for mounting on top of the engine portion, and also to provide a trailer body construction composed of a bottom, front and rear end walls, side walls and a top, all formed of separate units, adapted for assembly by means of screws or similar fastening devices.

An additional object of the invention is to provide novel means for swingably mounting the front end of the trailer body on the rear of the tractor chassis.

A still further object is to provide a toy of this character of simple and practical construction, which is neat and attractive in appearance, relatively inexpensive to manufacture, and otherwise well adapted for the purposes for which the same is intended.

While I have shown in the accompanying drawings a preferred form of my invention, I desire it understood that the same is susceptible of modification and change without departing from the spirit of my invention, as the same elements that form the trailer truck will constitute a truck.

Other objects and advantages reside in the details of construction and operation as more fully hereinafter described and claimed, reference being had to the accompanying drawings forming part hereof, wherein like numerals refer to like parts throughout and in which:

Figure 1:
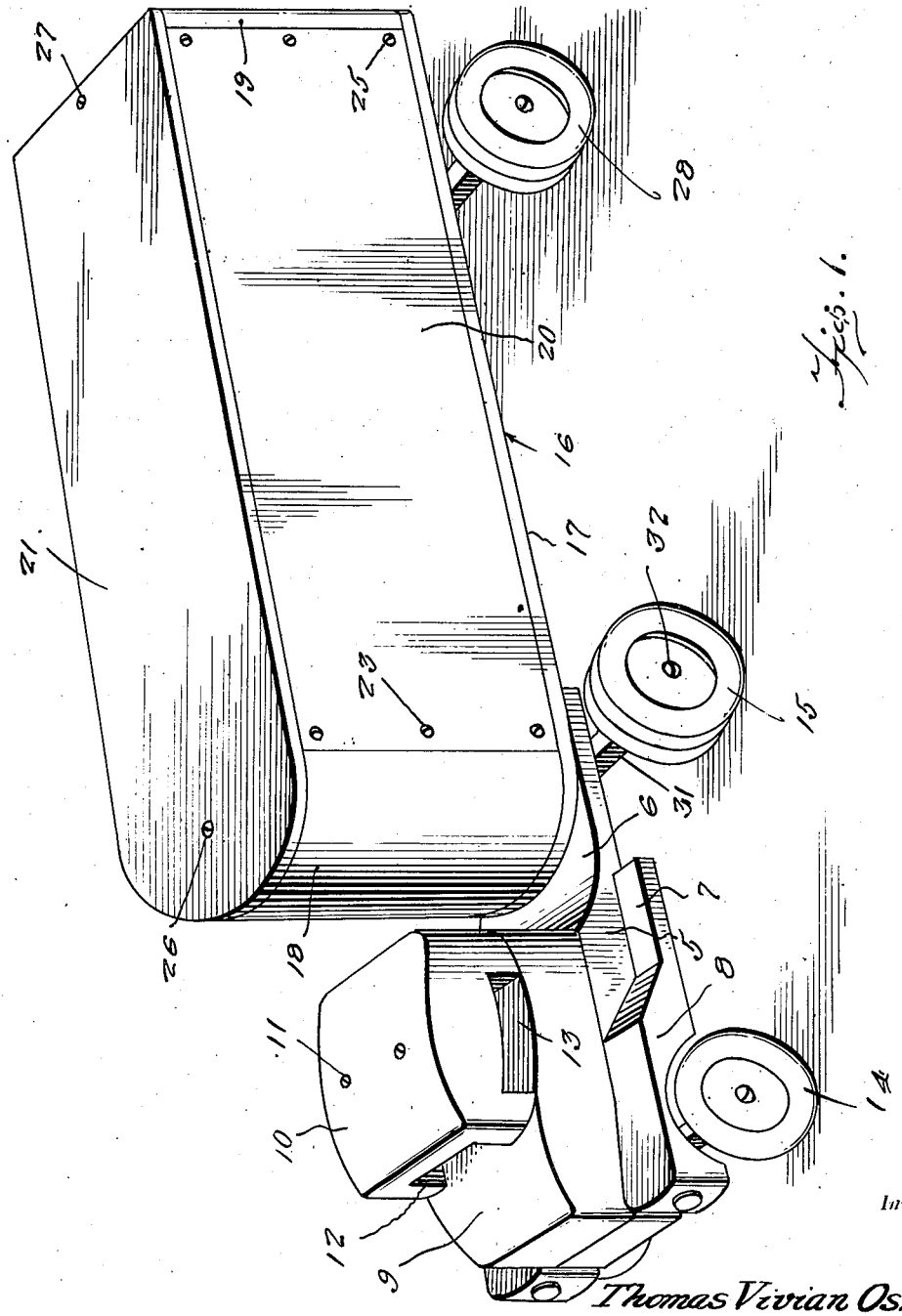
Figure 1 is a perspective view of the assembled toy.

Referring now to the drawings in detail, wherein for the purpose of illustration I have disclosed a preferred embodiment of the invention, the numeral 5 designates the tractor unit which includes the chassis portion 6 on the sides of which the running board 7 and fenders 8 are integrally formed and rising from the front portion of the chassis is a solid block element 9 representing the engine and lower portion of the cab construction secured to the chassis by means of screws or the like (not shown).

Positioned on top of the block 9 is the cab unit 10 secured to the block by means of screws or the like 11, the front and the sides of the lower portion of the cab unit having notches 12 and 13 formed therein to represent the windshield opening and side window opening, respectively.

The tractor is mounted on front and rear wheels 14 and 15.

The trailer unit is designated generally at 16 and comprises a bottom 17, a front end wall 18, rear end wall 19, side walls 20 and a top 21.

Figure 2:
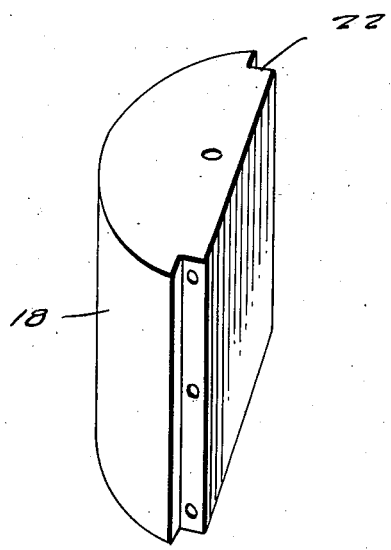
Figure 2 is a perspective view of the front end wall of the trailer body.
Figure 3:
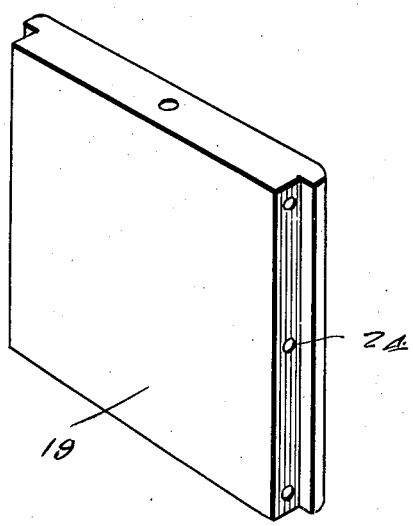
Figure 3 is a similar view of the rear end wall thereof.
Figure 4:
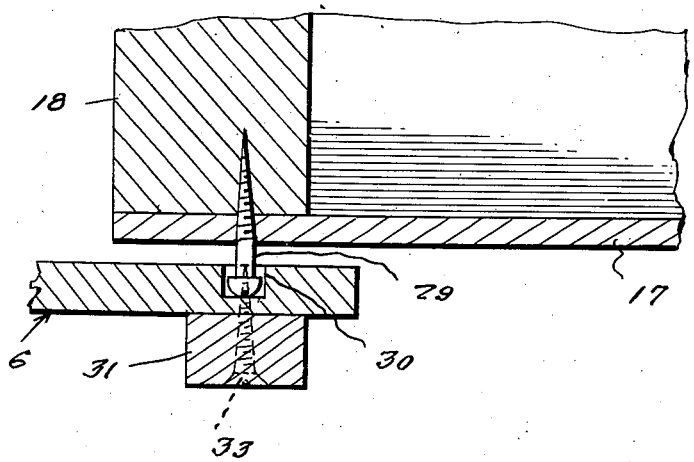
Figure 4 is a fragmentary sectional view of the swingable connection between the trailer and the tractor.

The front end wall 18 is shown in detail in Figure 2 of the drawings and is of semi-cylindrical form having its longitudinal side edges rabbeted, as shown at 22, within which the side walls 20 are recessed and secured thereto by means of screws or the like 23, the side walls 20 being flush with the surface of the edge portion of the front wall 18.

The rear wall 19 is also rabbeted, as shown at 24, for likewise receiving the side walls 20 which are secured thereto by screws or the like 25.

The front end of the top 21 is rounded to conform to the curvature of the front wall 18 and is secured on top of the front wall by means of a screw 26, while the rear end of the top is likewise secured to the rear wall 19 by means of a screw 27. The rear end of the trailer unit 16 is supported on wheels 28 and the front end of the trailer unit is provided with a screw 29 which projects upwardly through the bottom 17 and into the front wall 18 with the head of the screw projecting from the bottom and freely positioned in a recess 30 formed in the top of the chassis member 6 of the tractor, the head of the screw providing a swivel connection for the swinging of the trailer laterally.

The wheels 14, 15 and 28 are preferably of solid wooden construction shaped to simulate pneumatic vehicle tires and are secured in blocks 31 extending transversely of the tractor and trailer by means of screws 32. The blocks 31 are secured to the underside of the tractor and the trailer by means of screws 33.

From the foregoing, it will be apparent that the several structural units forming the toy may be easily and cheaply manufactured and sold in disassembled form and provide amusement as well as education for children in learning to assemble the several units into their completed form.

It will be understood that the side walls 20 may be constructed of a plurality of slats rather than the solid side wall construction as shown, or the sides of the trailer may embody a stake construction, if preferred.

It is believed the details of construction, operation and advantages of the toy will be readily understood from the foregoing without further detailed explanation.

Having thus described the invention what I claim is:

1. A toy of the class described comprising a tractor unit and a trailer unit, said trailer unit comprising a bottom, front and rear end walls, side walls and a top, said front end wall being of semi-cylindrical form and said front and rear walls having rabbeted side edges adapted to receive the ends of the side walls for positioning flush with the outer surfaces of the front and rear walls, fastening means securing said side walls to the end wall and fastening means for securing the top to the front and rear wall, and means for swingably supporting the front end of the trailer on the tractor and comprising a screw projecting upwardly through the bottom of the trailer into the front end wall and having its head projecting below said bottom, and said tractor having a recess in its upper surface adapted to swivelly receive the head of said screw.

2. A toy of the class described comprising a tractor unit including an integrally formed chassis, runner boards and fenders, a detachable block secured on said chassis unit simulating an engine hood and lower portion of a cab structure, a detachable cab top secured on said block, and a trailer unit having its front end swingably supported on said chassis of the tractor unit, said trailer unit including a screw projecting upwardly through the bottom of the trailer into the front end wall thereof and having its head projecting below said bottom, and said tractor having a recess in its upper chassis surface adapted to swivelly receive the head of said screw.

3. A toy of the class described comprising a tractor unit including an integrally formed chassis, running boards and fenders, a block secured on said chassis unit simulating an engine hood and lower portion of a cab structure, a cab top secured on said block, a platform at the rear portion of the chassis behind said cab, a trailer unit including front and rear end walls, side walls and a bottom, and a screw projecting upwardly through the bottom of the trailer into the front end wall thereof for securing said front end wall to the bottom, said screw having its head projecting below said bottom and said platform of the tractor having a recess in its upper surface adapted to swivelly receive the head of the screw for swingably connecting the front end of the trailer to the tractor.

THOMAS VIVIAN OSBORNE.